Patented July 28, 1931

1,816,297

UNITED STATES PATENT OFFICE

FRIEDRICH RASCHIG, OF LUDWIGSHAFEN-ON-THE-RHINE, GERMANY, ASSIGNOR TO THE FIRM DR. F. RASCHIG, OF LUDWIGSHAFEN-ON-THE-RHINE, GERMANY

MANUFACTURE OF DISINFECTANTS

No Drawing.    Application filed February 17, 1927.   Serial No. 169,139.

My invention relates to the manufacture of disinfectants and more particularly to a water-soluble disinfectant of which a monovalent phenolic body is the main constituent.

Antiseptic substances of great potency which are to be used for disinfecting purposes, must be soluble in water, for otherwise they could not be applied in the majority of cases where they would be of use.

It is known that certain antiseptic substances, which are not soluble in water, may be rendered soluble in water by means of a soap solution, whilst many other substances of antiseptic or disinfecting nature cannot be rendered soluble in water in this way to a satisfactory degree except by or upon the addition of a suitable agent. Thus thymol requires an addition such as formaldehyde in order to become soluble in a soap solution, whereas the several chlorophenols cannot at all be rendered soluble in water by means of soap, except a certain chloro-meta-cresol.

My object is to produce a water soluble disinfectant from chloro-thymol. Judging from experience and knowledge hitherto prevailing it could not be assumed that chloro-thymol which has a higher molecular weight and is still by far less soluble in water than thymol, might be rendered soluble in water in a practically useful degree by means of a mere soap addition. Contrary to expectation, however, I have found that chloro-thymol made by slowly adding or dripping sulphuryl chloride into thymol, and melting at 62 to 64° C., may be rendered soluble in water by the addition of a reasonable proportion of soap, although the said chlorothymol without the addition of the stated solvent element is of a very slight solubility in water not exceeding 0,03 per cent.

It is to be noted that the antiseptic or bactericidal potency of chloro-thymol is so enormous that the simple aqueous solution thereof containing 0,03 per cent of chlorothymol only, will give satisfaction in some cases or for certain purposes. Even if the prodigious antiseptic power of chloro-thymol should be reduced a little by the addition or presence of larger amounts of soap than required in connection with the commonly used cresol, still the antiseptic effect of the former will be so high as to excel by far that of the higher phenols hitherto employed for similar purposes.

I shall now proceed to describe the manner in which I manufacture the new disinfectant according to my invention. My invention viewed from its broadest aspect resides in the production and obtention of water-soluble chloro-thymol, but includes also a particular or preferred manner of manufacturing the same. Broadly I mix for the purpose chloro-thymol with a suitable soap and a suitable alcohol. A mixture of 1 part by weight of chloro-thymol, 3 parts by weight of potassium-soap, and 1 part by weight of ethylic alcohol will give satisfactory results in all cases. Preferably, however, I combine or unite both the manufacture of the soap and the operation of mixing the same with the other constituents so as to form a compound process. The structural formula of chloro-thymol is 1 methyl-3 hydroxy-4 isopropyl-6 chlorobenzol.

With this object in view I mix 25 parts by weight of castor oil or a similar or equivalent oil or a mixture of the same with 5 parts by weight of caustic potash or potassium hydrate, 10 parts by weight of chloro-thymol and 10 parts by weight of ethylic alcohol, and I heat the mixture for a length of time sufficient to render the same soluble in water. Upon subsequent cooling the mixture will congeal so as to form a gelatinous mass.

The gelatinous product thus obtained is ready for use and storage. In some cases, however, I add 1 part by weight of water to 1 part by weight of the mixture and I thus obtain a commercial 10 per cent solution of chloro-thymol which is preferable for certain purposes owing to the easier dosing readiness thereof.

The antiseptic or disinfecting power of a chloro-thymol solution of the described kind is by far superior to that of cresol or chlorocresol solutions of a still higher concentration. For general use one part of the said 10 per cent solution may be diluted with 200 parts of water in order to obtain a disinfecting liquor which will be of sufficient strength in most cases of application for disinfecting purposes.

A further advantage of my improved disinfectant resides in the fact that the slight smell thereof is not unpleasant and not at all so offensive as that of phenol or chloro-cresol. The 10 per cent solution above mentioned is, chemically speaking, a chloro-thymol soap solution which may be diluted with any quantity of water and still will remain absolutely clear and limpid. It goes without saying that the comparatively high proportion of soap therein is necessary solely for the purpose of complying with the requirement of obtaining clear limpid solutions.

In practice, however, clear solutions are not always required and emulsions in which the chloro-thymol is dispersed and evenly suspended in the form of extremely minute particles and which, therefore, are not limpid, nevertheless answer sometimes the purposes for which they are to be employed. Obviously in case of manufacturing a commercial solution for the purpose an amount of soap may be used which is considerably less than the proportion, required for the production of the solution herein before described. Thus in the above described 10 per cent chloro-thymol soap solution the proportion of chloro-thymol to soap is like 1 to 3, while a commercial 50 per cent chloro-thymol soap solution, for exemplification, may be manufactured in an analogous manner to contain soap in the proportion of 2 to 1, that is one part of chloro-thymol to half a part of soap.

In preparing an emulsion from the last mentioned or 50 percent chloro-thymol solution water is to be added to the latter to the amount required or desired. It is to be noted, however, that an emulsion made in this way will not keep for a greater length of time for the reason that the chloro-thymol soon separates and deposits in crystalline form.

Now after much study and research I have found that emulsions, which are stable and keep well for a long period of time may be obtained by employing, in lieu of castor oil or similar oils as above described, a mixture of a suitable resin and oleic acid or the like in preparing the initial or commercial 50 per cent chloro-thymol solution above described.

By way of example I mix 20 parts (by weight) of colophony or any similar or equivalent resinous substance,
2 parts (by weight) of oleic acid,
20 parts (by weight) of alcohol,
50 parts (by weight) of chloro-thymol,
8 parts (by weight) of caustic soda of 40° Bé., and I heat the mixture until the ingredients thereof are fully liquefied to form a uniform or homogeneous liquid. Water is or may be added to the latter as required or desired and the alcohol may be replaced, partially or wholly, by any other suitable substances which will act to reduce the congealing or solidifying tendency of the chloro-thymol, such as cyclohexanon, camphora and the like.

I have not attempted to explain all of the minute details of the process or operations of manufacturing my improved disinfectant, for it will be understood by those to whom this specification is addressed, that all of the operations required for the purpose, will necessarily have to be carried out in accordance with the known rules and tenets of modern chemistry. It, therefore, will be evident, that my invention, while still being adhered to in its main essentials, may be varied and adapted in many ways, according to the requirements desired, or most suitable under different circumstances.

What I claim is:—

1. A disinfectant composition of high concentration, comprising chloro-thymol and soap.

2. A disinfectant composition of high concentration forming stable emulsions with water, comprising chloro-thymol and a resinous soap.

3. A disinfectant composition, comprising chloro-thymol, a resinous soap and oleic acid.

In testimony whereof I have affixed my signature.

FRIEDRICH RASCHIG.